(12) United States Patent
Savage et al.

(10) Patent No.: US 7,194,414 B1
(45) Date of Patent: Mar. 20, 2007

(54) SELF-SERVICE TERMINAL

(75) Inventors: John G. Savage, Fife (GB); Jonathan S. Black, Dundee (GB); Kenneth A. Nicoll, Dundee (GB)

(73) Assignee: NCR Corporation, Dayton, OH (US)

( * ) Notice: Subject to any disclaimer, the term of this patent is extended or adjusted under 35 U.S.C. 154(b) by 535 days.

(21) Appl. No.: 09/433,135

(22) Filed: Nov. 3, 1999

(30) Foreign Application Priority Data

Nov. 11, 1998 (GB) .................................. 9824762.0

(51) Int. Cl.
*G06Q 99/00* (2006.01)
*G06Q 40/00* (2006.01)
*G10L 15/00* (2006.01)

(52) U.S. Cl. .......................... 705/1; 704/246; 704/275; 235/379; 705/35; 705/43

(58) Field of Classification Search .................... 705/1, 705/35, 39, 42, 43; 704/270, 271, 275; 235/379
See application file for complete search history.

(56) References Cited

U.S. PATENT DOCUMENTS

| | | | |
|---|---|---|---|
| 4,420,751 A | | 12/1983 | Paganini et al. |
| 4,462,080 A | * | 7/1984 | Johnstone et al. .......... 704/200 |
| 4,593,183 A | | 6/1986 | Fukatsu ...................... 235/379 |
| 5,185,515 A | | 2/1993 | Nishibe ...................... 235/379 |
| 5,412,189 A | | 5/1995 | Cragun ....................... 235/379 |
| 5,604,341 A | | 2/1997 | Grossi et al. ................ 235/379 |
| 5,704,009 A | * | 12/1997 | Cline et al. ................. 395/2.84 |
| 5,878,395 A | * | 3/1999 | Bennett ...................... 704/272 |
| 5,991,726 A | * | 11/1999 | Immarco et al. ............ 704/270 |
| 6,009,161 A | * | 12/1999 | Babbitt et al. .............. 379/264 |
| 6,014,626 A | * | 1/2000 | Cohen ........................ 704/275 |
| 6,061,666 A | * | 5/2000 | Do et al. ..................... 705/43 |
| 6,081,782 A | * | 6/2000 | Rabin |
| 6,241,151 B1 * | | 6/2001 | Swaine et al. |
| 6,347,299 B1 * | | 2/2002 | Holzman et al. ........... 704/270 |
| 6,484,936 B1 * | | 11/2002 | Nicoll et al. |
| 6,535,855 B1 * | | 3/2003 | Cahill et al. ................. 705/1 |

FOREIGN PATENT DOCUMENTS

| | | | |
|---|---|---|---|
| EP | 0583896 | | 2/1994 |
| EP | 0860772 | | 8/1998 |
| GB | 2119992 | | 11/1983 |
| JP | 11-308309 | * | 11/1999 |
| WO | 9621925 | | 7/1996 |
| WO | 9823062 | | 5/1998 |
| WO | WO 00/28495 | * | 5/2000 |

OTHER PUBLICATIONS

Cillo: "Deneba's Canvas 3.0 sets high graphics standard. (Deneba Systems Inc.) (Evaluation)", Computer Pictures, Oct.-Nov. 1991, vol. 9, No. 6, p. 12.*

* cited by examiner

*Primary Examiner*—Dennis Ruhl
(74) *Attorney, Agent, or Firm*—Michael Chan

(57) ABSTRACT

A self-service terminal, such as an ATM (10), comprises a speech generator (31) and loudspeaker (30) for producing natural language operating instructions for a user, and a user interface (12) permitting the user to interact with the terminal (10) in response to the spoken instructions. The user interface may include a microphone (32) and a speech recognition module (33).

9 Claims, 2 Drawing Sheets

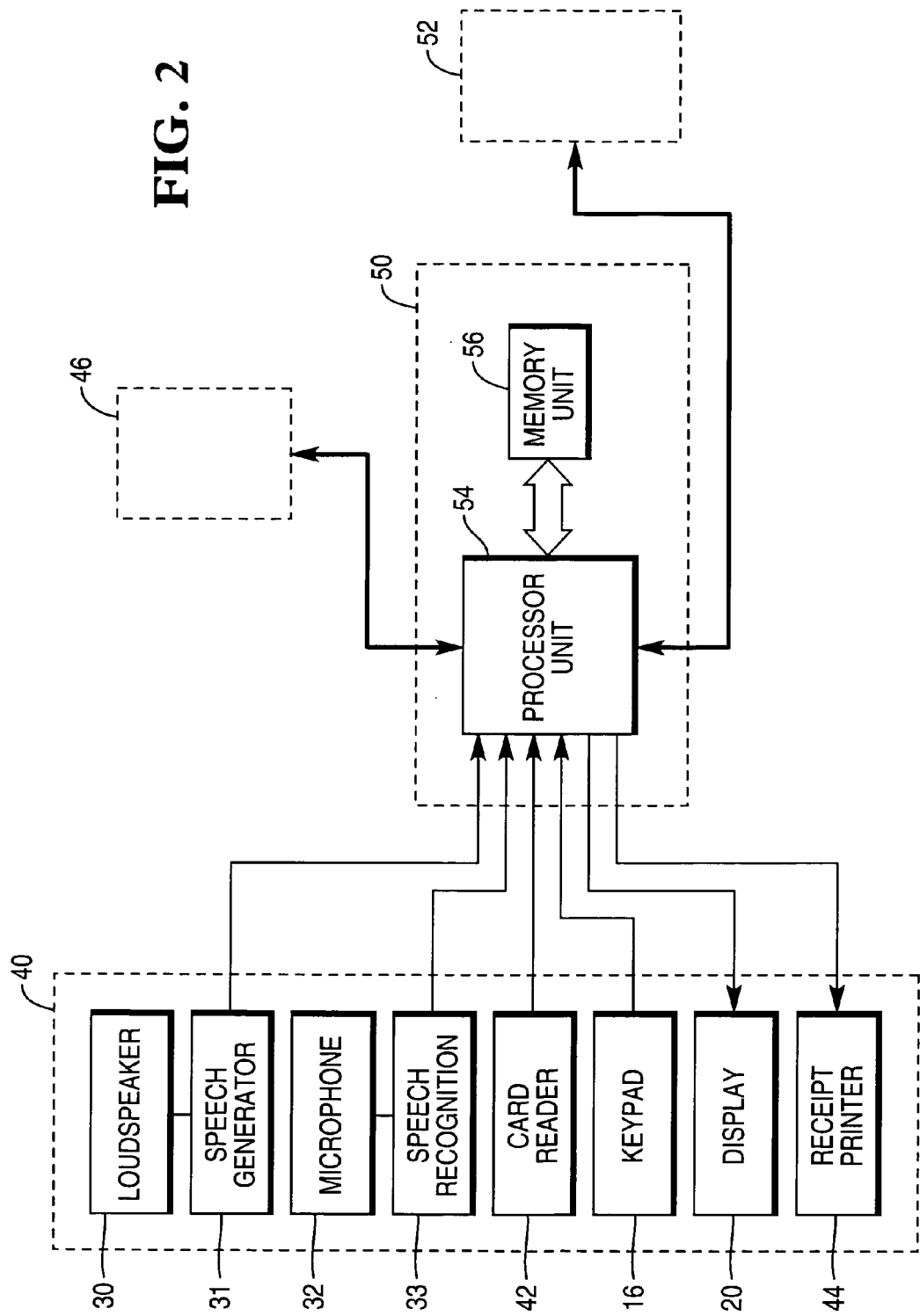

US 7,194,414 B1

SELF-SERVICE TERMINAL

BACKGROUND OF THE INVENTION

This invention relates to a self-service terminal (SST), such as an automated teller machine (ATM). In particular, the present invention relates to an SST which facilitates communication with a user.

A conventional self-service terminal (SST), such as an automated teller machine (ATM), comprises a user keypad for, among other things, selecting menu options, inputting personal identification number (PINs) and the like, and a screen for displaying information to be read by the user, such as instructions and prompts. SSTs used to carry-out security sensitive operations, such as an ATM utilized in the withdrawal of funds from a bank account, may also incorporate means for assisting in identifying a user, or verifying the identity of a user, such as a card reader, accessed via a card reader slot.

While such conventional machines may be used without difficulty by many people, there is a significant proportion of the population who will experience difficulties interacting with such machines. In particular, user instructions and prompts are displayed on a relatively small CRT or LCD display, and thus persons with reading difficulties or any visual impairment may find it difficult if not impossible to operate a machine. For example, a person who is "long-sighted", and who does not have vision-correcting eyeglasses in their possession, may have difficulty reading instructions and prompts from such a display.

SUMMARY OF THE INVENTION

It is among the objectives of embodiments of the present invention to obviate or mitigate this disadvantage.

According to the present invention there is provided a self-service terminal (SST) comprising:

instructing means for producing audible terminal operating instructions for the user;

interface means for permitting the user to interact with the terminal in response to said instructions; and means for processing user interactions with the terminal.

According to another aspect of the present invention there is provided a method of operating a self-service terminal (SST), the method comprising:

producing audible device operating instructions for a terminal user;

permitting the user to interact with the terminal in response to said instructions; and processing user interactions with the terminal.

As used herein, the term "device operating instructions" is intended to encompass terminal outputs such as prompts and information relating to a transaction or operation to be carried out on the SST, and also information or other matter not directly relevant is a current transaction or operation, such as information on other services provided by the device operator, for example information on services provided by a financial institution, or an invitation to arrange a meeting with an advisor.

In a preferred embodiment the present invention permits a self-service terminal to communicate with a user through natural speech or other sounds, and thus obviates the difficulties associated with the user having to read device operating instructions or prompts from a small screen or other display.

Preferably, the terminal further comprises means for recognizing natural speech, such that the user may interact with the terminal using spoken instructions and prompts. This permits the user and terminal to converse: the terminal will issue instructions in natural speech; the user will provide a spoken response; and the terminal will process and react to the user response. The instructions issued may be tailored to provoke a number of predetermined responses, for example "yes" or "no", and the processing means may be tailored to expect and respond appropriately to a selected one of the anticipated responses.

Preferably also, the instructing means is capable of producing a selected one of a plurality of voices during a transaction or operation, for example a female voice and a male voice. The voice produced by the terminal may be pre-selected by the user, or be pre-selected depending on the age or sex of the user, for example the terminal may issue instructions with a young person's voice when it has been ascertained that a young person is using the machine. In addition, the instructing means may be capable of issuing instructions in a local accent or dialect, and where the terminal includes speech recognition means, such means may be capable of receiving and understanding instructions in a local accent or dialect: for example, in some parts of the United Kingdom, many people will use the word "Aye", rather than "Yes", and numbers, as may make up a personal identification number (PIN) or a sum of funds to be withdrawn from an ATM, are often pronounced differently in different geographical areas.

The terminal may further comprise means for identifying the user or verifying the identity of the user. Such means may include a card reader or a biometric sensor, and the user may also have to verify their identity by inputting a personal identification number (PIN) or code word.

The terminal may further comprise means for sensing that a user wishes to use the terminal, such as a proximity sensor which identifies that a user has approached the terminal, and on sensing the presence of the user the instructing means may issue an initial instruction, prompt or greeting and the user interaction means be prepared to receive one of a number of anticipated user inputs or responses, or to initiate a user identification or identity verification process. In the absence of an appropriate user input within a predetermined time interval, the terminal may return to a "waiting" mode, ready to greet the next user.

BRIEF DESCRIPTION OF THE DRAWING

These and other aspects of the present invention will now be described, by way of example, with reference to the accompanying drawings, in which:

FIG. 2 is a block diagram representation of the terminal of FIG. 2.

DETAILED DESCRIPTION

Figure 1:
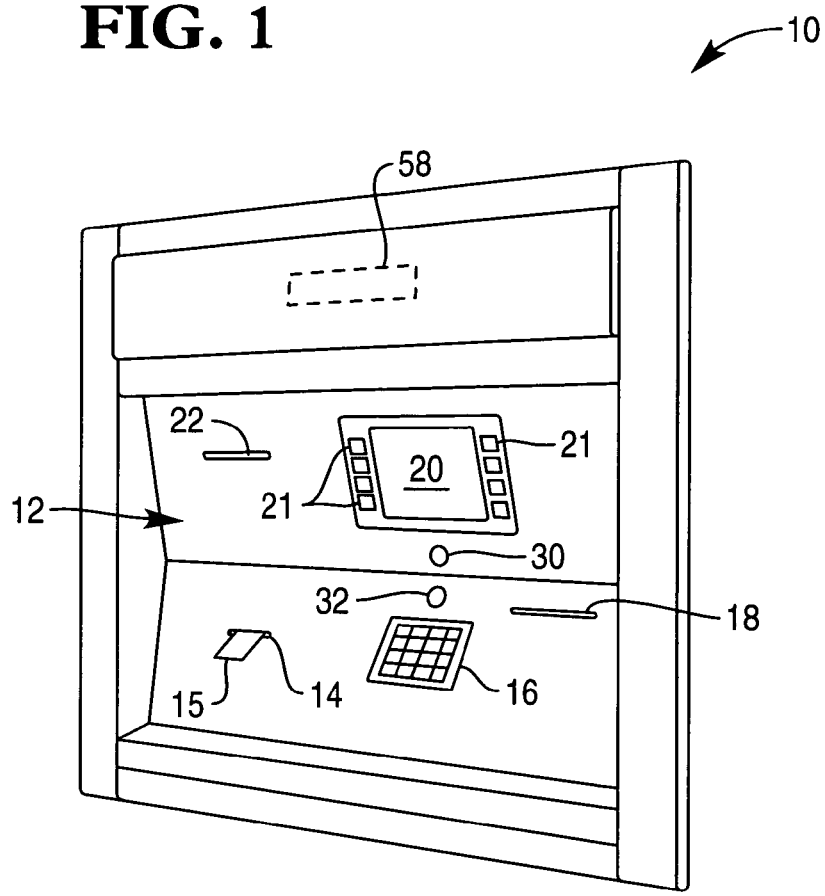
FIG. 1 is a diagrammatic representation of an SST in accordance with one embodiment of the present invention, in the form of an ATM.

Reference is first made to FIG. 1 of the drawings, which illustrates an SST in accordance with one embodiment of the present invention in the form of an ATM 10. In this example, the ATM 10 includes many of the features of a conventional ATM, namely an interface means in the form of a user panel 12 including a card reader slot 14 (which is shown having means for identifying the user in the form of an identification card 15 partially inserted therein), a key pad 16 for entering the user's personal identification number (PIN) and transaction details, a cash dispenser slot 18 through which bank notes are dispensed to a user, a display screen 20 for providing information to the user, additional keys 21 disposed at opposite sides of the screen 20 for enabling the user to select preset functions displayed on the screen 20 and aligned with the additional keys 21, and a receipt printer slot 22 through which a receipt for a transaction may be delivered to a user at the end of a transaction.

In addition, the ATM 10 of the present invention includes a loudspeaker 30 and a microphone 32, which allow the ATM 10 and the user to communicate primarily or solely using natural speech, as described below.

Reference is now also made to FIG. 2 of the drawings, which is a block diagram of the ATM 10 of FIG. 1. FIG. 2 shows a user interface module block 40 including the loudspeaker 30, a speech generation module 31, the microphone 32 and a speech processing and recognition module 33. The block 40 also includes the other elements found in a conventional ATM user interface, that is a card reader module 42, the key pad 16, the display 20, and a receipt printer module 44. The card reader module 42 and the receipt printer module 44 are associated with the respective slots 14 and 22 of the user panel 12 of the ATM 10. FIG. 2 also shows a cash dispenser module 46 which is associated with the cash dispenser slot 18.

The ATM 10 further comprises processor means in the form of a controller unit 50 which communicates with components of the user interface module block 40, with an operator panel 52 mounted inside of the ATM 10, and with the cash dispenser module 46.

The operator panel 52 contains circuitry for enabling an authorized operator to interact with the ATM 10. Standard operator panels 52 are used on a commercially available ATMs and are well known in the art. Similarly, the cash dispenser module 46 will not be described herein as it is a standard feature of a conventional ATM.

The controller unit 50 includes a processor unit 54 and a non-volatile memory 56. The processor unit 54 and memory 56 may be implemented by a micro-computer having non-volatile RAM; suitable computers and memories are readily available commercially.

In use, the user inserts their card 15 into the card reader slot, and identification data encoded on the card (typically in a magnetic strip located on one side of the card) is read by the card reader module 42. By doing this the user is claiming an identity. For using this example of an ATM 10, the user will have previously identified a preference for the manner in which the user communicates with ATMs 10: in the conventional manner via the screen display 20 and the keypad 16 and keys 21; or, where available, by natural speech via the loudspeaker 30 and microphone 32. In the latter case, the user is requested, by appropriate actuation of the speech generation module 31 and loudspeaker 30, to state their identification number (PIN) or a code word to verify the claimed identity, that is to verify that the person in possession of the card 15 is the authorized card owner. The user then speaks into the microphone 32, the speech recognition module 33 processing the speech sounds. If the user's identity is verified by recitation of the correct PIN or code word, the user is permitted to access the facilities provided by the ATM 10 and a menu of the various transactions available to the user is described via the loudspeaker 30: the speech generation module 31 may be controlled to run through a sequence of options and to prompt a particular response if a particular option is to be selected, for example:

ATM: "If you wish to withdraw cash, please say "one" into the microphone; or if you wish to hear your account balance; please say "two"."

User: "One".

This "conversation" continues until the transaction has been completed, or is interrupted.

It will be apparent to those of skill in the art that the ATM 10 described above may be utilized without difficulty by users with reading difficulties and users who are visually impaired. Further, it is anticipated that many other users would prefer to converse with a terminal, particularly as the voice generation module 31 may be configured to issue instructions in a particular voice, accent or dialect: for example, the ATM 10 may converse with a user with a woman's voice, with a local accent and in local dialect. Other users may choose other voices, or the voice may be selected by the ATM operator: a user whose account is overdrawn may be advised, in a stern male voice, to immediately contact the relevant financial institution. Also, the voice may be varied during a transaction, for example one voice may be used to issue instructions and prompts, and another voice used to describe other services not related to the transaction in progress.

Similarly, the speech recognition module 33 may be configured to expect instructions and prompts from the user in different voices, accents and dialects.

Users may be reluctant to converse with a terminal within earshot of others, particularly where security sensitive information, such as a PIN or code word, is being relayed to the terminal. Accordingly, terminals in accordance with the invention may be enclosed, partially enclosed, or otherwise arranged to minimize the possibility of the conversation between the terminal and the user from being overheard by third parties. Alternatively, or in addition, the terminal may be provided with sensors 58 for determining the location of the user, and directional loudspeakers and microphones, such that the speech volume may be kept at a relatively low level, and to assist in eliminating background noise.

To obviate the requirement for the user to state an identification number (PIN) or the like, terminals in accordance with the invention may utilize biometric sensing means for identifying or verifying the identity of the user. Such biometric sensing means are known and may use one or more of a variety of biometric patterns, including iris patterns, fingerprints, palm prints, voice patterns, finger geometry, or other physical traits or characteristics.

The embodiment described above incorporates many of the features of a conventional ATM, however it is of course possible to provide a terminal in accordance with the invention which may omit, for example, the keypad 16, display screen 20 and keys 21, with a corresponding saving in costs, and providing greater flexibility in the design and configuration of the terminal.

In other embodiments, the SST may take a different form from that illustrated and described, for example a kiosk for issuing flight tickets.

What is claimed is:

1. A method of allowing a user of a self-service terminal to conduct an item dispensing transaction using spoken words without the user having to train the terminal to recognize the spoken words, the method comprising:

creating at least one audible item dispensing prompt which contains within the prompt itself at least one word which is provided by the terminal and which can be spoken by the user to instruct the terminal to dispense an item to the user;

delivering the at least one audible prompt to the user;

receiving at least one word spoken by the user after the at least one audible prompt is delivered to the user;

determining if the at least one word received from the user corresponds to the at least one word provided by the terminal; and dispensing an item to the user when the at least one word received from the user corresponds to the at least one word provided by the terminal.

2. A method of allowing a customer of an automated teller machine (ATM) to conduct a cash dispensing transaction using spoken words without the customer having to train the ATM to recognize the spoken words, the method comprising:

creating at least one audible cash dispensing prompt which contains within the prompt itself at least one word which is provided by the ATM and which can be spoken by the customer to instruct the ATM to dispense cash to the customer, delivering the at least one audible prompt to the customer, receiving at least one word spoken by the customer after the at least one audible prompt is delivered to the customer;

determining if the at least one word received from the customer corresponds to the at least one word provided by the ATM; and dispensing cash to the customer when the at least one word received from the customer corresponds to the at least one word provided by the ATM.

3. A self-service terminal for allowing a user of the terminal to conduct an item dispensing transaction using spoken words without the user having to train the terminal to recognize the spoken words, the terminal comprising:

means for creating at least one audible item dispensing prompt which contains within the prompt itself at least one word which is provided by the terminal and which can be spoken by the user to instruct the terminal to dispense an item to the user;

means for delivering the at least one audible prompt to the user, means for receiving at least one word spoken by the user after the at least one audible prompt is delivered to the user;

means for determining if the at least one word received from the user corresponds to the at least one word provided by the terminal; and means for dispensing an item to the user when the at least one word received from the user corresponds to the at least one word provided by the terminal.

4. A terminal according to claim 3, further comprising means for sensing that a user desires to use the terminal.

5. A terminal according to claim 4, wherein the sensing means comprises a proximity sensor.

6. A self-service terminal for allowing a user of the terminal to conduct an item dispensing transaction using spoken words without the user having to train the terminal to recognize the spoken words, the terminal comprising:

means for creating at least one audible item dispensing prompt which contains within the prompt itself a question which can be answered by the user speaking either a positive response or a negative response to the question;

means for delivering the at least one audible prompt to the user;

means for receiving at least one word spoken by the user after the at least one audible prompt is delivered to the user;

means for determining if the at least one word received from the user answers the question contained within the at least one audible prompt delivered to the user, and means for dispensing an item to the user when the at least one word received from the user answers the question by indicating that the user chooses to have an item dispensed.

7. A terminal according to claim 6, wherein the determining means includes means for determining if the at least one word received from the user is a positive response to the question.

8. An automated teller machine (ATM) for allowing a customer of the ATM to conduct a cash dispensing transaction using spoken words without the customer having to train the ATM to recognize the spoken words, the ATM comprising:

means for creating an audible cash dispensing prompt which contains within the prompt itself a cash dispensing word which is provided by the ATM and which can be spoken by the customer to instruct the ATM to dispense cash to the customer;

means for delivering the audible cash dispensing prompt to the customer;

means for receiving at least one word spoken by the customer after the audible cash dispensing prompt is delivered to the customer;

means for determining if the at least one word received from the customer corresponds to the cashing dispensing word provided by the ATM; and means for dispensing cash to the customer when the at least one word received from the customer corresponds to the cash dispensing word provided by the ATM.

9. An ATM according to claim 8, further comprising:

means for creating an audible balance enquiry prompt which contains within the prompt itself a balance enquiry word which is provided by the ATM and which can be spoken by the customer to instruct the ATM to provide the customer with a number representing the balance of the customer's account; and means for providing the customer with a number representing the balance of the customer's account when the at least one word received from the customer corresponds to the balance enquiry word provided by the ATM.

* * * * *